United States Patent de Queiroz et al.

[11] Patent Number: 5,892,854
[45] Date of Patent: Apr. 6, 1999

[54] AUTOMATIC IMAGE REGISTRATION USING BINARY MOMENTS

[75] Inventors: Ricardo L. de Queiroz, Fairport; Dennis L. Venable, Marion, both of N.Y.

[73] Assignee: Xerox Corporation, Stamford, Conn.

[21] Appl. No.: 787,502

[22] Filed: Jan. 21, 1997

[51] Int. Cl.$^6$ .................................................. G06K 9/36
[52] U.S. Cl. ........................ 382/288; 382/286; 382/293
[58] Field of Search ................................. 382/288, 291, 382/273, 295, 296, 298, 203, 286, 293; 358/488; 345/121

[56] References Cited

U.S. PATENT DOCUMENTS

| | | | |
|---|---|---|---|
| 3,846,755 | 11/1974 | Hart | 382/288 |
| 4,181,952 | 1/1980 | Casey et al. | 364/515 |
| 4,649,498 | 3/1987 | Kedem et al. | 364/518 |
| 4,922,350 | 5/1990 | Rombola et al. | 358/488 |
| 4,922,543 | 5/1990 | Ahlbom et al. | 382/48 |
| 5,115,476 | 5/1992 | Ito | 382/288 |
| 5,220,398 | 6/1993 | Horn et al. | 356/152 |
| 5,253,765 | 10/1993 | Moorehead et al. | 209/539 |
| 5,485,568 | 1/1996 | Venable et al. | 395/155 |
| 5,528,387 | 6/1996 | Kelly et al. | 358/488 |
| 5,533,144 | 7/1996 | Fan | 382/288 |
| 5,619,593 | 4/1997 | Ono | 382/291 |
| 5,649,021 | 7/1997 | Matey et al. | 382/128 |
| 5,694,486 | 12/1997 | Shigeeda et al. | 382/298 |

OTHER PUBLICATIONS

Graphics Gems I, A. Glassner, Ed. Academic Press, "A Deed Fill Algorithm", pp. 275–277, 1990.

Klaus Voss and Herbert Suesse; ". . . Fitting of Planar Objects by Primitives"; 1015–4651/96; 1996 IEEE Proceedings of ICPR '96; pp. 508–512.

Radmilo M. Bozinovic and Sargur N. Srihari; "Off–Line Cursive Script Word Recognition"; IEEE Transactions on Pattern Analysis and Machine Intelligence, vol. 11, No. 1, Jan. 1989 pp. 68–83.

1995 Proceedings, vol. 1; *Technical Association of the Graphic Arts;* "Managing and Representing Image Workflow in Prepress Applications"; Dennis L. Venable, Rob Buckley, and Toshiya Yamada; pp. 373–385.

*Primary Examiner*—Joseph Mancuso
*Assistant Examiner*—Gilberto Frederick, II

[57] ABSTRACT

The present invention is a method and apparatus for automatically detecting the characteristics of a document object placed on the platen of a digital copier or similar scanning system. The invention accomplishes the detection by processing a digitized image in a highly efficient manner using binary moments, and using the moments characterizes the shape of a boundary about the object. Once determined, the shape of the object may be employed to further process the image to automatically crop, derotate, and register the image at a predefined location in an output image suitable for rendering on a document substrate.

13 Claims, 9 Drawing Sheets

AUTOMATIC IMAGE REGISTRATION USING BINARY MOMENTS

This invention relates generally to registration of an image of a document placed on the platen of an image input device, and more particularly to the automatic registration of such an image object using binary moments.

CROSS-REFERENCE

The following related applications are hereby incorporated by reference for their teachings:

"METHOD AND APPARATUS FOR IDENTIFYING A PLURALITY OF SUB-IMAGES IN AN INPUT IMAGE," Dennis L. Venable et al., application Ser. No. 08/786,538, filed concurrently herewith (D/95149);

"STRUCTURED IMAGE (SI) EDITOR AND METHOD FOR EDITING STRUCTURED IMAGES," Michael R. Campanelli et al., application Ser. No. 08/338,856, filed Nov. 14, 1994; and "LOCATING THE POSITION AND ORIENTATION OF MULTIPLE OBJECTS WITH A SMART PLATEN," Dennis L. Venable., application Ser. No. 08/785,109, filed concurrently herewith (D/95149Q).

BACKGROUND AND SUMMARY OF THE INVENTION

To improve the ease of use of scanning systems, in particular digital copiers, it is desirable to automatically register scanned objects (e.g., a hard copy document) on the platen of the input scanner. To facilitate automated registration or positioning of an object, it is necessary to identify the position, shape and rotation angle of the object. Such a capability can enhance productivity by decreasing the time required for scanning documents and reduce the requirement for accurate presentation placed upon document feeding mechanisms.

The present invention is directed to a system intended to automatically determine the boundaries of an object within a scanned image. The present invention combines a number of graphics and image processing techniques into an automated system that provides productivity enhancement for digital copiers and scanning systems.

The present invention accomplishes these objectives by:
1) locating an object within an input image;
2) modeling the shape of the identified object (e.g., rectangle); and
3) positioning the object in a digital image at a predefined location.

Heretofore, a number of patents and publications have disclosed image registration or the use of moments in pattern recognition, the relevant portions of which may be briefly summarized as follows:

U.S. Pat. No. 485,568 to Venable et al., issued Jan. 16, 1996, and hereby incorporated by reference, discloses a method and apparatus for representing a complex color raster image as a collection of objects in a structured image format—a hierarchical, device-independent format. A structured image document, generated using the techniques described by Venable, is a representation of data that may be rendered into a raster image. The data includes simple raster images as well as a hierarchical collection of sub-objects and raster processing operations. The possible data types for objects in the structured image include a raster image, text, graphics, image processing description, and files containing multiple image representations U.S. Pat. No. 5,528,387 to Kelly et al., issued Jun. 18, 1996, teaches electronic image registration in a scanner. In particular, the edge data of a document is detected and skew angle calculated. The image is then rotated based upon the skew angle and nonimage areas are filled using an image generation feature.

U.S. Pat. No. 4,922,350 to Rombola et al., issued May 1, 1990, discloses a two-pass scanning apparatus for detecting the size and position of an original document on a scanner platen. Image signals captured on a first scan are employed to determine boundaries and a best-fit magnification so that the image may be fit to a recording sheet using image signals generated on a subsequent scanning pass.

U.S. 5,253,765 to Moorehead et al, issued Oct. 19, 1993, teaches a system for sorting randomly sized objects (e.g., mushrooms). Invariant moments are employed, utilizing the complete pixel information for all pixels within the border of a captured image, to extract information about the mushroom size and orientation.

U.S. Pat. No. 5,220,398 to Horn et al. teaches an analog VLSI microchip that uses moments to determine the position and orientation of an object in a scene.

In "Invariant Fitting of Planar Objects by Primitives," published in 1996 *IEEE Proceedings* of ICPR '96, pp. 508–512 Voss et al. teach a method of pattern recognition using primitives such as triangles, rectangles, circles ellipses, superquadratics, etc. The authors further describe a technique for describing the primitives using moments in a normalized manner; resulting in a decrease in the numerical effort.

In "MANAGING AND REPRESENTING IMAGE WORKFLOW IN PREPRESS APPLICATIONS", *Technical Association of the Graphic Arts* (*TAGA*) Vol. 1, 1995 Proceedings pp. 373–385, hereby incorporated by reference for its teachings, Venable et al. teach the use of structured images to manage prepress workflow.

In accordance with the present invention, there is provided an imaging apparatus, comprising:

an image input device, said image input device producing a digitized image including a representation of an object;

a programmable computer capable of processing the digitized image, said computer including a first memory for storing at least a portion of the digitized image and program memory for the storage of executable code suitable for causing said computer to execute image processing operations on the digitized image, said computer, in accordance with preprogrammed instructions, identifying the object within the digitized input image, modeling a shape representing a boundary of the object using moments, and characterizing the object by parameters including shape, position and orientation;

said computer automatically producing an output image including a representation of the object, wherein the representation has at least one altered parameter; and an image output device suitable for rendering the output image in a human viewable form In accordance with another aspect of the present invention, there is provided a method for processing an image including:

receiving a digitized image including a representation of an object;

processing the digitized image on a programmable computer, said computer including a first memory for storing at least a portion of the digitized image and program memory for the storage of executable code suitable for causing said computer to execute image processing operations on the digitized image, identifying, with said computer, the representation of the object within the digitized input image;

modeling a shape representing a boundary of the object using moments;

characterizing the object by parameters including shape, position and orientation;

automatically producing an output image including a representation of the object, wherein the representation has at least one altered parameter; and rendering the output image in a human viewable form.

One aspect of the invention deals with a basic problem in digital image processing, that of identifying an object within a digitized image. The solution to this problem is leveraged to accurately control the placement of an object within a digital document. The techniques described herein enable a user to expediently scan a document or other object, automatically recognizing the shape of the document within the digitized image, and composing a digital document incorporating the object. The invention employs binary moments in the recognition of the object to provide a robust recognition method.

The techniques described above are advantageous because they improve the efficiency of a scanning process, reducing the need for accurate registration of the object on the platen of the image input device. In addition, the techniques allow for the automatic re-registration of the object image in an output document without user intervention.

The present invention will be described in connection with a preferred embodiment, however, it will be understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of 2N values. A "multi-bit" item of data is an item of data that includes more than one bit.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A signal "indicates" or "selects" one of a set of alternatives if the signal causes the indicated one of the set of alternatives to occur. For example, a signal can indicate one bit set in a sequence of bit sets to be used in an operation, in which case the signal causes the indicated bit set to be used in the operation.

An "image" is a pattern of physical light. An image may include characters, words, and text as well as other features such as graphics. A text may be included in a set of one or more images, such as in images of the pages of a document. An image may be processed so as to identify specific "objects" within the image, each of which is itself an image. A object may be of any size and shape and has "physical attributes" or characteristics including, but not limited, to position, shape and orientation. For example, an object may be a document, when the document is placed on the platen of an image input device and the region of the platen is digitized to produce a representation thereof.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation performs "image processing" when it operates on an item of data that relates to part of an image.

Pixels are "neighbors" or "neighboring" within an image when there are no other pixels between them and they meet an appropriate criterion for neighboring. If the pixels are rectangular and appear in rows and columns within a two-dimensional image, each pixel may have 4 or 8 neighboring pixels, depending on the criterion used.

An "edge" occurs in an image when two neighboring pixels have sufficiently different pixel values according to an appropriate criterion for the occurrence of an edge between them. The terms "edge pixel" or "boundary pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

A "version" of a first image is a second image produced using an item of data defining the first image. The second image may be identical to the first image, or it may be modified by loss of resolution, by changing the data defining the first image, or by other processes that result in modifying pixel values of the first image.

An "image input device" is a device that can receive an image and provide an item of data defining a version of the image. A "scanner" is an image input device that receives an image by a scanning operation, such as by scanning a document. A scanner may have a transparent surface (platen) or equivalent means to support a document during scanning. Other well-known image input devices include digital cameras, facsimile machines, and video recorders having the capability to store data signals representative of the intensity of light reflected from the surface of objects at which the device is directed.

An "image output device" is a device that can receive an item of data defining an image and provide or render the image as output. A "display" is an image output device that provides the output image in human viewable form, and a "printer" is an image output device that renders the output image in a human viewable, hard copy form.

Figure 1:
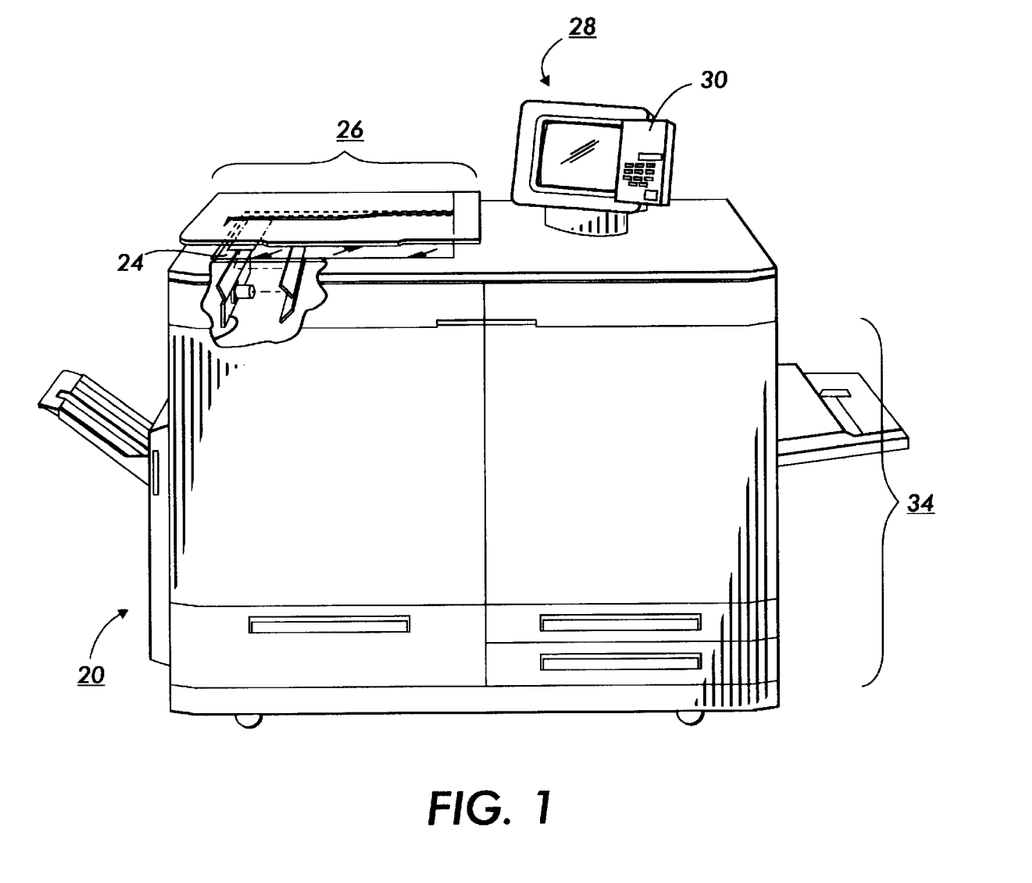
FIG. 1 is an illustration of an exemplary digital color printing system serving as an embodiment for the present invention.
Figure 2:
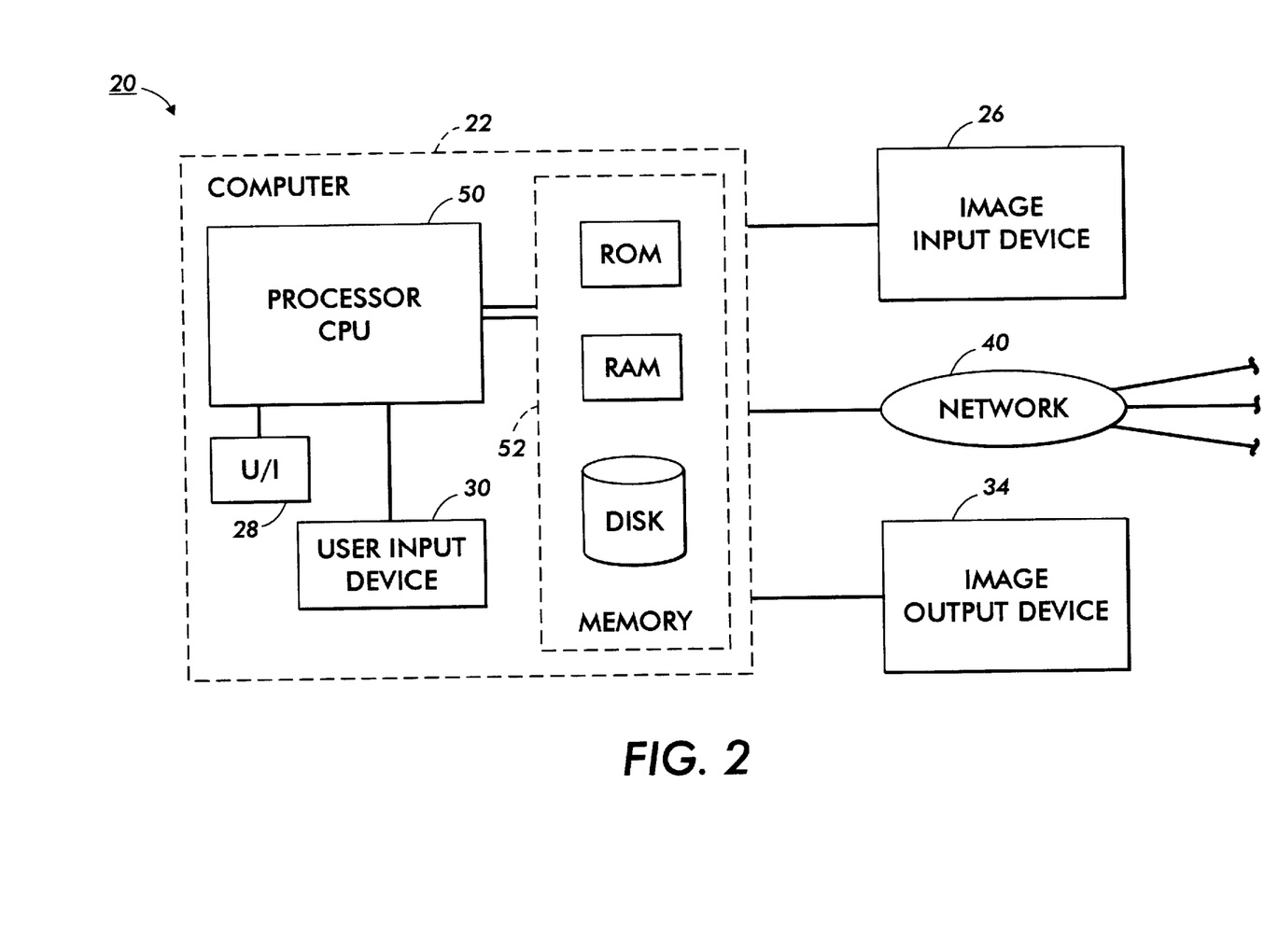
FIG. 2 is a block diagram of the various components comprising the system of FIG. 1.

Referring now to FIGS. 1 and 2, depicted therein is a digital printing system 20 in which the present invention finds particular use. For example, system 20 may be a Xerox DocuColor® 40 Digital Color Printing System or the Xerox 5775® Digital Color Copier. System 20 includes a computer or data processing unit 22 (FIG. 2) capable of receiving digital data representing an image of an original document 24 placed upon a platen of scanner 26. Computer 22, initially stores the digital input data from scanner 26 in memory 52 (e.g., RAM or magnetic disk storage) where the image may subsequently be accessed. In addition to the digital data, memory 52 may also include program memory for the storage of object code suitable for directing the processor to execute image processing operations in accordance with the invention described herein. Computer 22 has associated therewith a user interface (U/I) 28 including one or more user input devices 30, such as a keyboard, a keypad, a mouse, trackball, stylus or equivalent pointing device, etc.

Figure 3:
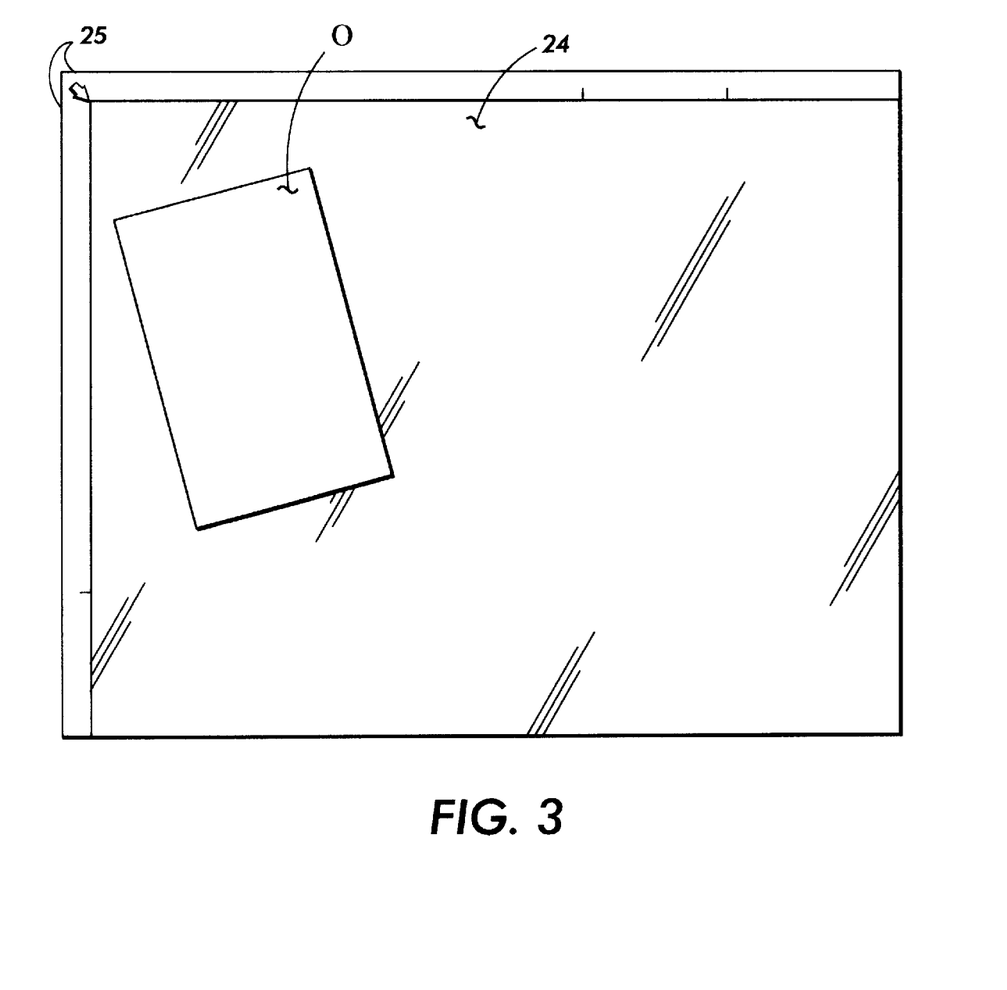
FIG. 3 is an illustration of the placement of a document object on a platen of the scanner depicted in FIG. 1.

Also part of system 20 is a color image output device such as printer 34 which may include a laser-driven, xerographic printing engine as found in a number of commercially available printers. In a preferred embodiment, system 20 is employed to process the digital image data received as input from a scanner 26, utilizing image processing software running in processor 50, so as to produce an output file that may be rendered by printer 34, stored in memory 50, and/or transmitted to another device via network 40. Although system 20 is depicted as an integrated unit in FIG. 1, it will be appreciated that the system may also comprise a plurality of independent yet interconnected units. Referring also to FIG. 3, it will be appreciated that the document placed upon the scanner platen 24 in system 20, may not be accurately registered along the registration edges 25. For example, a particular embodiment to which the following description will be directed is a single document object O placed in a central location on the platen 24 as illustrated in FIG. 3. In accordance with the present invention it is desired to automatically identify the position, shape and rotation angle of object O. In a facsimile transmission system using a set of rollers to advance a document through a scanning nip, it will be appreciated that the document may become skewed during the digitization process and that the present application may have particular application to such systems as well.

Given an input image generated by scanning the scanner platen, the present invention automatically identifies at least the position, shape and orientation angle of the object. As shown in the flow chart of FIG. 4, the process carried out by computer 22, of FIG. 3 during the processing of the input image includes three general steps. First, at step 100 the object within the image is located and boundaries of the object are generally identified. Once the object is located, the shape of the object is modeled at step 200. Having located the object and modeled its shape, a structured image or similar digital document format representing the image and the object therein can be created as represented by step 300. The structured image preferably includes data representing not only the image data itself, but data representing the location, shape or orientation of the object, or some combination thereof. Alternatively, the output may be a page description language format or equivalents formats suitable for storing the image information in a retrievable form.

In an embodiment of the present invention, the scanned input image (or a lower resolution version thereof is loaded into a memory frame buffer (RAM) where it is analyzed in accordance with the previously described steps. For purposes of the following detailed description, it is assumed that the object is distinguishable from the image background (e.g, the platen cover) and that the background of the image is contiguous. These simplifying assumptions are intended for purposes of explanation only and are not intended as limitations of the invention. One skilled in the art will appreciate that the invention described herein is extensible so as not to require operation only within the boundaries of such assumptions.

Figure 4:
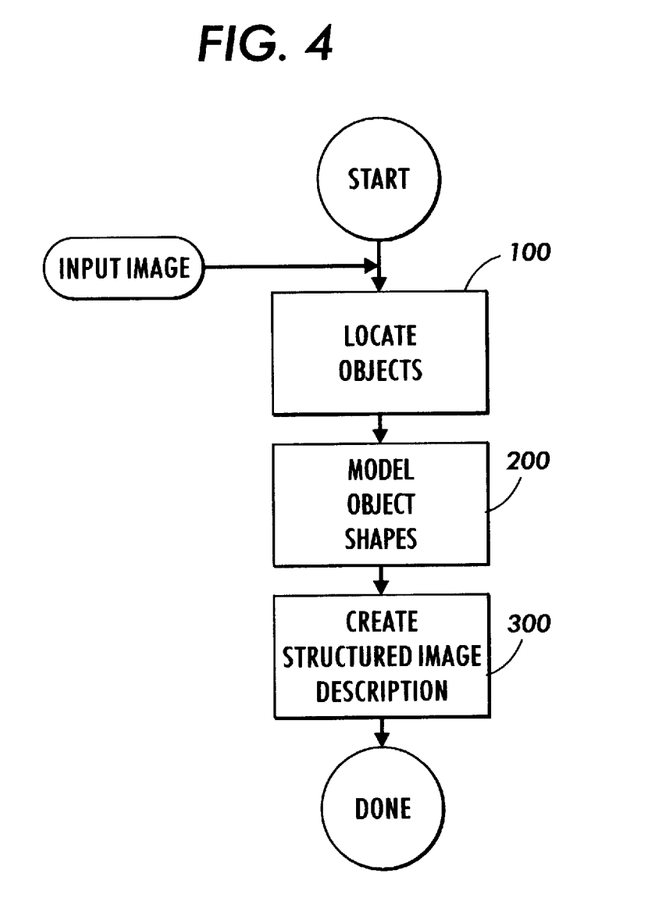
FIG. 4 is a flowchart illustrating the general processing steps carried out on the system of FIGS. 1 and 2 in accordance with the present invention.
Figure 5:
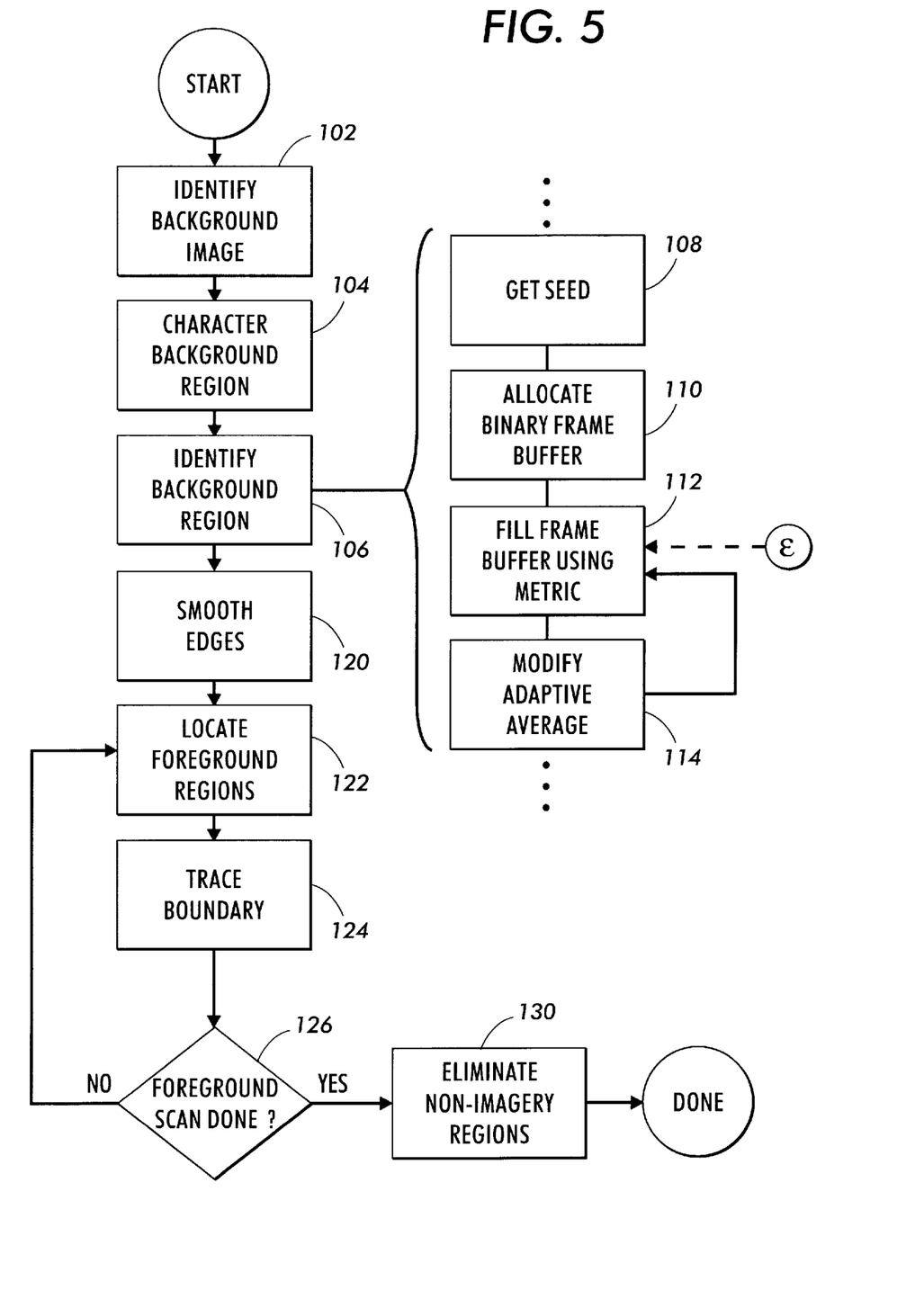
FIGS. 5 and 6 are detailed flow charts illustrating the processing steps carried out in accordance with the present invention.

As depicted by the flow chart of FIG. 5, the object location step 100 of FIG. 4 is performed by first identifying the background region of the input image 102, characterizing the background region 1 04, and then using the characteristic of the background region as a seed, identifying all the pixels representing the background region with an adaptive seed fill algorithm 106. Background pixels are pixels not associated with any objects, or more simply, they are pixels representative of those regions lying outside of the objects, the values of which are controlled by the "background" against which the objects are placed during scanning (e.g., the underside of the platen cover). One embodiment employs the average color of a small region in the upper left-hand corner of the scanned image as an initial estimate of the background color. Alternatively, other sampling operations may be employed to determine the background color as described, for example, in U.S. Pat. No. 5,282,091 for a Programmable Apparatus for Determining Document Background Level by Farrell.

Once the background color is characterized at step 104, an adaptive algorithm is preferably applied to monitor the background color and to accurately identify the objects. An example of a seed fill algorithm suitable for use in the present invention is described in *Graphic Gems I*, A. Glassner Ed., Academic Press, pp. 275–277, 1990, hereby incorporated by reference. An adaptive algorithm is required because the background pixels may have significant color variation resulting from a variation in illumination over the platen area. The adaptive seed fill algorithm is applied to the scanned color image data using an initial seed point characterized by the background, step 108, for example, the upper-left corner of the image. Generally, after allocating the frame buffer, step 110, the adaptive seed fill algorithm fills the binary frame buffer with a mask indicating all contiguous pixels identified as background pixels. In a simple embodiment, represented by step 112, a pixel is considered to be a background pixel if its color falls within a small distance e of the current average background pixel value. This distance is calculated as an Euclidean metric in red, green, blue (RGB) color space $$d=\text{SQRT }((P_r-\text{AdAvg}_r)^2+(P_g-\text{AdAvg}_g)^2+(P_b-\text{AdAvg}_b)^2),$$

where $P_k$, $\text{AdAvg}_k$ are, respectively, the RGB components of the pixel under test and the average background value, and d is the distance measurement. The value of $\epsilon$ is fixed and empirically determined in one embodiment. The test conducted at step 112 is:

if d<$\epsilon$, then pixel P is a background pixel, else pixel P is a foreground pixel.

The average background color is adaptively modified at step 114 by taking the average value of the last N pixels that have been classified as background. For efficiency, the system preferably calculates the adaptive average using the equation:

$$\text{AdAvg}'=(N*\text{AdAvg}-\text{AdAvg}+\text{LastVal})/N,$$

where AdAvg' is the modified average, AdAvg is the previous adaptive average, LastVal is the value of the last pixel identified as background, and N is the averaging window. Clearly, this is not a true running average, but it tracks the running average adequately and is more computationally efficient than a strict running average calculation. Alternatively, the value of can be adaptively modified. For example, $\epsilon$ might be based on the standard deviation of the last several pixels identified as background, etc.

It will be appreciated that alternative methods for the detection of background regions may be employed, and that the process of obtaining a binary map distinguishing the objects from the background may be accomplished using a simplified thresholding operation based upon the background color. In a preferred embodiment, the background color may be a function of the color of the platen cover, such as a white cover. As a further example, the digital color production system may employ a spectrally reflective or otherwise distinguishable platen cover that results in a background color that may be detected and distinguished from the objects.

Having identified background pixels and created a representation of the object boundaries, noisy edges can be optionally smoothed (step 120) using, for example, morphological filtering. Subsequently, contiguous foreground regions are located, step 122, thereby identifying the objects. Objects are identified by scanning the background mask generated by the adaptive seed fill operation (step 106). Starting with the upper left hand pixel, the mask is searched in a scan line fashion for a pixel not classified in the mask as a background pixel—thus identifying pixels associated with a foreground object. The use of the seed fill algorithm for identifying the background assures that foreground objects are closed, or in other words, a complete boundary is formed about the perimeter of the object.

At step 124, the boundary of an object is identified by tracing its edge. The boundary of the foreground object is traced using a simple 8-connected edge traversal operator which provides an ordered-set of points tracing the edge of the object. Such an edge traversal operation employs a contour tracing operation to generate a chain code in a manner similar to word or character based recognition systems. An 8-connected process is described, for example, by R. Bozinovic et al. in "Off-Line Cursive Script Word Recognition", *IEEE Transactions on Pattern Analysis and Machine* Intelligence, Vol. 11, No. 1 (January 1989). Once the edge is traced, all pixels associated with the object in the mask are marked as background so they will not be processed a second time, the object is added to the foreground object list and then the scanning of step 122 is continued as indicated by test step 126. Subsequent to completing the foreground scanning to identify all objects, a review of the identified objects may be completed as represented by step 130. In many cases, the scanned image may contain undesirable foreground objects; such objects can be eliminated from the object list at this step. In the situation of detecting multiple objects, one main object would preferably be selected using any of a number of techniques. For example, object selection could be accomplished by retaining the object with the largest perimeter or based upon the location of the object.

Referring again to FIG. 4, once the object has been located, as described with respect to step 100, the next general step, step 200, is to model the shape of the object. For purposes of simplicity, the following description will treat rectangular-shaped objects, however, it will be appreciated that the description of the invention is extensible to other polygons and even to shapes having portions thereof represented by curves (e.g., circular or elliptical objects). The result or output from step 100 is a set of bounding pixels or a set of edge traces preferably organized in the form of a linked list. These pixels or traces can be used to extract the object, but orientation is not yet determined. To improve the quality of the object extraction, the object traces are fitted to a model shape. Orientation information, and other characteristics of the object may then be extracted from the fitted parameters.

One method of fitting the edge traces to a rectangular shape is a method employing binary moments for fast image bounding. Using the binary mask generated as described with respect to step 106 (e.g., the adaptive seed fill algorithm), or alternatively with a simple thresholding operation, a representation of the platen image is rendered in a binary bitmap form where each pixel value is a 0 or 1 indicating background or non-background regions. Once the borders are detected for the object using the binary mask, the embodiment depicted as a flowchart in FIG. 6 employs second-order binary moments to fit a shape (e.g., rectangle) to the object.

Figure 6:
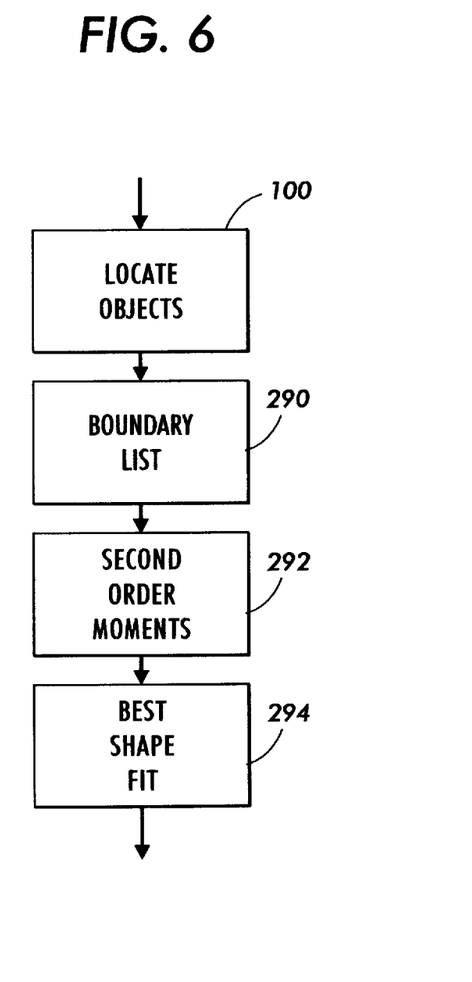

The use of binary moments enables a single-pass analysis of the binary mask to fully characterize the image object. Calculation of the parameters that characterize the object is done only once and demands only negligible computation because there are only six moments necessary to characterize the object. Referring to FIG. 6, depicted therein is a generalized flowchart representing the steps of the binary moment boundary finding technique. At step 100, the object edges are located and recorded as previously described, thereby providing as an input a linked list of boundary or edge pixels referred to as an edge trace, step 290. Using the boundary list, the second order moments are calculated (step 292) in an efficient manner using the equation:

$$\mu_{kn} = \sum_i \sum_j p(i,j) i^k j^n = \sum_i \left( \sum_j p(i,j) j^n \right) i^k = \sum_i p_n(i) i^k$$

where p(i,j) is the image pixel value at image coordinates (i,j) and $p_n(i)$ is the $n^{th}$ order moment of the $i^{th}$ scan line.

Because the object boundary pixels are previously determined, the process can be simplified and the right-most and left-most boundary pixels for a particular scanline are used for the 1st order (absolute) moment calculations. In particular, step 292 approximates the moment of the object on a scanline-by-scanline basis, using the extreme boundary pixel locations. One method of accomplishing the calculation is to construct a list where each scanline is represented and where the list includes entries of the minimum (leftmost) and maximum (rightmost) boundary pixel of the object. Working through the linked list of boundary edge pixels as output by step 100, each pixel is analyzed to determine if a scanline entry exists, if not one is created and the maximum and minimum. pixel positions are set to the y-axis (horizontal) position of the boundary pixel. If a scanline entry already exists, the current boundary pixel has a horizontal position to the left of the minimum horizontal position or to the right of the maximum pixel position and the appropriate value is updated with the horizontal position of the current pixel. Once the linked list of boundary pixels is worked through completely, the list of scanline minimum and maximum pixel positions may be employed to calculate the horizontal moments (along scanlines) for each scanline, or alternatively a subset of scanlines.

As we are not interested in the actual pixel values, but on the object shape and location, we can use the binary representation of the image for the moment calculations. In order to further reduce computation we assume we are interested in isolated solid objects. Accordingly, the rightmost (max.) and leftmost (min.) border pixels for each scanline in the object are employed, ignoring the rest of the image pixels that may lie between them by assuming the image is p(i,j)=1 in-between the border pixels. Let S1 (min.) and S2 (max.) be the indices of the first and last pixels, respectively, belonging to the object at the i-th scanline (determined as described above) and let N be the number of non-zero p(i,j) in such a scanline, i.e. N=S2–S1+1. Then, $$p_0(i) = N$$
$$p_1(i) = (S1 + S2)N/2$$
$$p_2(i)NS1S2 + \frac{N(N+1)(2N+1)}{6}$$

It should be appreciated that if N=0, S1 and S2 have no meaning and the three moments are identically zero.

It will be further appreciated by those skilled in the art that the computational efficiency of this algorithm may be improved by employing look-up tables for the multiplication operations. Also notable is the elimination from further processing of the zero-valued pixel locations in the binary mask.

Subsequently, the 2nd order (central) moments ($m_{00}$, $m_{01}$, $m_{10}$, $m_{11}$, $m_{20}$, and $m_{02}$) are calculated using the 1st order moments and the following equations:

$$x_c = -\mu_{10}/\mu_{00},$$
$$y_c = -\mu_{01}/\mu_{00}, \text{ and}$$

-continued
$$m_{pq} = \sum_{r=0}^{p} \sum_{s=0}^{q} \binom{p}{r} \binom{q}{s} x_c^{p-r} y_c^{q-s} \mu_{rs}.$$

Figure 7:
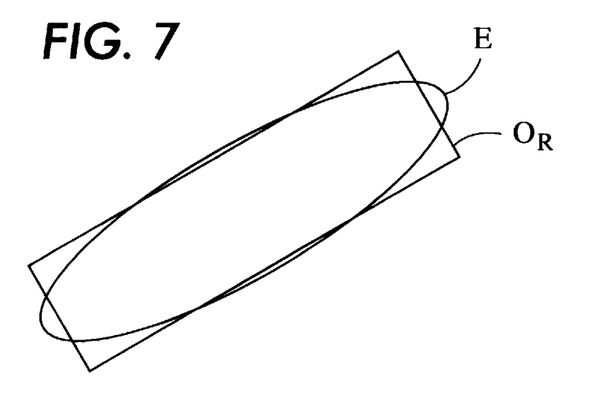
FIGS. 7 and 8 are illustrative examples of an object and an elliptical shape employed to characterize the shape of the object.

Having determined the 2nd order moments, they are employed to characterize an ellipse and from the ellipse the bounding box about the object, step 294. As shown in FIG. 7, an ellipse E can be used to approximate the boundary of a rectangular object $O_R$ to a rough approximation. As a first order approximation, the best fitting ellipse has the same area as the object and minimizes the "fitting error." In order to characterize the ellipse E, the following parameters are determined from the central moments. Let $$z_1 = m_{20} + m_{02},$$

$$z_2 = \sqrt{(m_{20} - m_{02})^2 + 4m_{11}^2} \quad , \text{and}$$

$$z_3 = m_{00}/2, \text{ then}$$

$$a = \sqrt{(z_1 + z_2)/z_3} \quad ,$$

$$b = \sqrt{(z_1 - z_2)/z_3} \quad ,$$

$$\theta = \frac{1}{2} \tan^{-1}\left( \frac{2m_{11}}{m_{20} - m_{02}} \right), \text{ and}$$

the center of the ellipse is given by $$x_c = m_{10}/m_{00} \text{ and}$$

$$y_c = m_{01}/m_{00}.$$

It will be further appreciated that other parameters such as object area, size, perimeter etc. are easily determined from the above basic parameter set.

Figure 8:
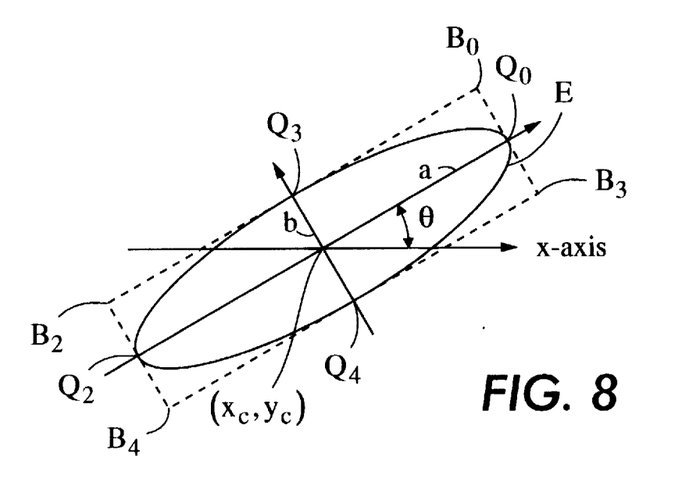

Referring to FIG. 8, the center of the ellipse (xc',yc), the lengths of each axis (a and b) and the rotation angle (Θ) are determined. The bounding box for the rectangular object is determined as a rectangle centered at (xc,yc) with sides of length 2a and 2b, rotated by an angle Θ. Once the parameters are determined, it is then possible to identify the corners of the bounding rectangle about the object. Defining the vectors $$V_1 = (a \cos(\Theta), a \sin(\Theta)) \text{ and}$$

$$V_2 = (-b \sin(\Theta), b \cos(\Theta)),$$

and the center $$C = (x_c, y_c),$$

the points where the ellipse axes contact the bounding rectangle are:

$Q_0 = C + V_1$;
$Q_1 = C - V_1$;
$Q_2 = C + V_2$;
$Q_3 = C - V_2$;

and the four corners of the rectangle are:

$B_0 = C + V_1 + V_2$;
$B_1 = C - V_1 + V_2$;
$B_2 = C + V_2 - V_2$; and
$B_3 = C - V_1 - V_2$.

While the above calculations render a bounding box slightly larger than the object, this is done to provide a safety margin for the calculation, and to avoid cropping a portion of the object. If a tighter bounding box is desired, the rectangle may be characterized with sides of length 2αa and 2αb, where a is set equal to √3/2 or other fraction.

Figure 9:
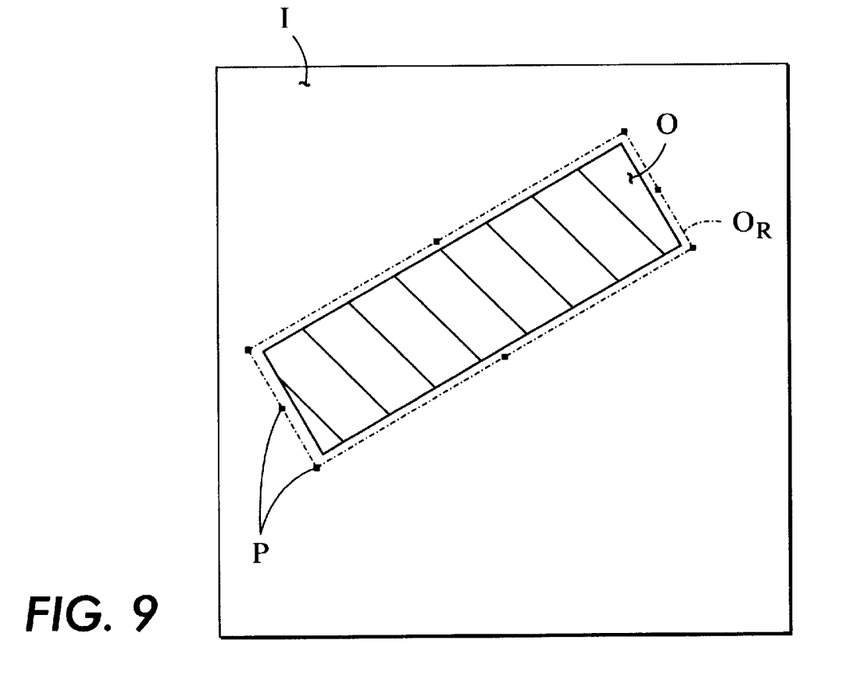
FIGS. 9 and 10 are exemplary images that may be processed in accordance with the present invention.
Figure 10:
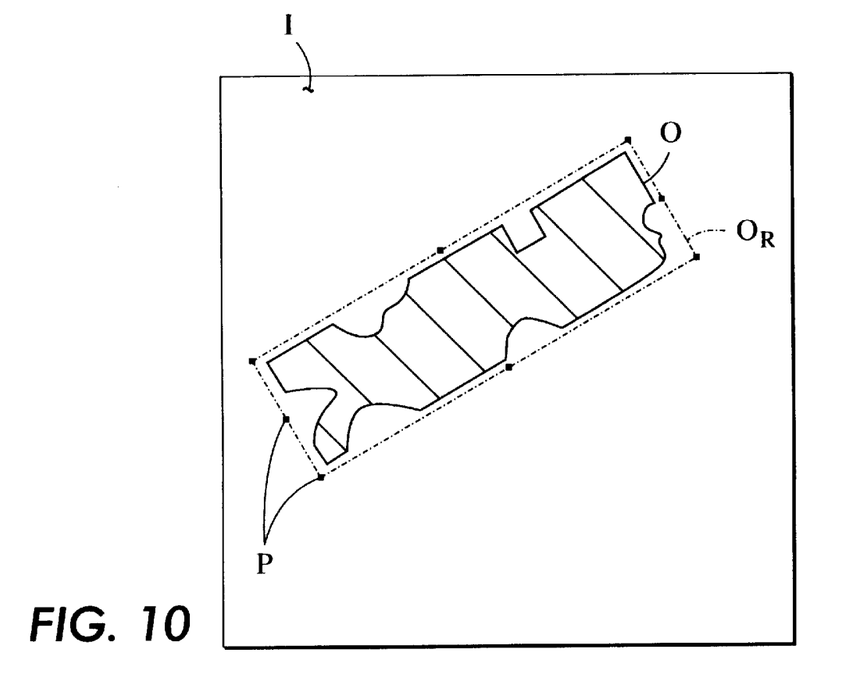

Examples of the bounding rectangle generated in accordance with the present invention are found in FIGS. 9 and 10. In FIG. 9, the object O is bounded by an object rectangle $O_R$, where the rectangle edges are defined by points P. Similarly, the degraded object of FIG. 10 is also found and characterized, in spite of the fact that the object representation did not have smooth, linear edges.

Figure 11:
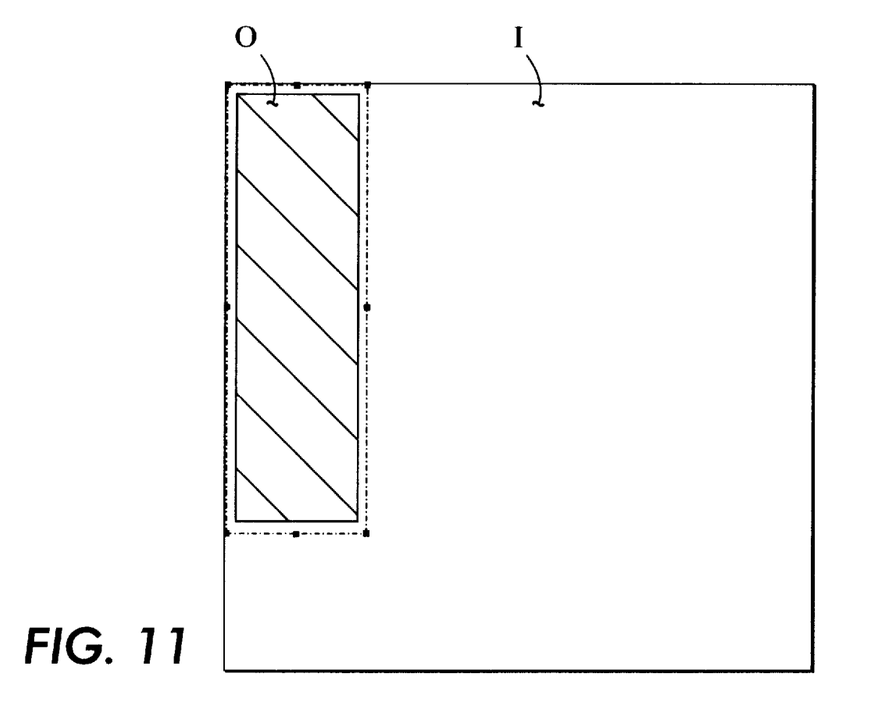
FIG. 11 is an exemplary illustration of an image processed in accordance with aspects of the present invention.

After the object has been modeled it is preferably de-rotated and repositioned in an automated fashion without user intervention. For example, referring to image object O in FIG. 9, it would be preferable to crop and derotate the image pixels within the rectangular boundary $O_R$ to automatically register the image in the center or upper-left corner of an output document image (I) such as depicted in FIG. 11. The automated operations enabled by the accurate identification of the image boundaries reduces or eliminates the need for extremely accurate registration of the document object on the platen. Such operations and positioning would preferably be user programmable as enabled by a user interface. Moreover, the robustness of the binary moment operations allows the system to operate in spite of imperfections or other discontinuities in the original document.

Although the various embodiments of the present invention have been described with respect to a digital copying system, it will be appreciated that the acquisition of images, and the printing and distribution of documents can be accomplished via networks.

In recapitulation, the present invention is a method and apparatus for automatically detecting the characteristics (e.g., size, shape, location and orientation) of a document object placed on the platen of a digital copier or similar scanning system. The invention accomplishes the detection by processing a digitized image in a highly efficient manner using binary moments, and using the moments characterizes the shape of a boundary about the object. Once determined, the shape of the object may be employed to further process the image to automatically crop, derotate, and register the image at a predefined location in an output document.

It is, therefore, apparent that there has been provided, in accordance with the present invention, a method and apparatus for the automatic registration of an image using binary moments. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An imaging apparatus, comprising:
   an image input device, said image input device producing a digitized image including a representation of an object;
   a programmable computer capable of processing the digitized image, said computer including a first memory for storing at least a portion of the digitized image and program memory for the storage of executable code suitable for causing said computer to execute image processing operations on the digitized image,
   said computer, in accordance with preprogrammed instructions, identifying the object within the digitized input image, modeling a shape representing a boundary of the object using moments, and characterizing the object by parameters including shape, position and orientation; wherein the preprogrammed instructions for said computer modeling of the shape of the object, further comprise:
   creating a binary representation of the digitized image so as to identify edges of the object represented therein;
   generating, using the binary representation of the digitized image, a set of binary moments to characterize the shape of the object, including
   determining, on a scanline basis, the maximum and minimum pixel positions along the scanline for all pixels lying on edges of the object,
   using the maximum and minimum pixel positions, calculating first order binary moments for each scanline and summing the binary moments, and
   using the first order binary moments, calculating second order binary moments for the object;
   using the binary moments characterizing a shape that has substantially the same area as the object; and
   from the moments and the shape approximating the parameters of the object;
   said computer automatically producing an output image including a representation of the object, wherein the representation has at least one altered parameter; and
   an image output device suitable for rendering the output image in a human viewable form,.

2. The apparatus of claim 1, wherein the preprogrammed instructions for said computer modeling of the shape of the object, further comprise:
   creating a binary representation of the digitized image so as to identify edges of the object represented therein;
   generating, using the binary representation of the digitized image, a set of binary moments to characterize the shape of the object;
   using the binary moments characterizing a shape that has substantially the same area as the object; and
   from the moments and the shape approximating the parameters of the object.

3. The apparatus of claim 2 wherein the parameters are selected from the group consisting of:
   shape;
   size;
   position; and
   orientation.

4. The apparatus of claim 2, wherein the position and the orientation of the object are altered, in response to the object parameters, so as to render the object in a derotated manner.

5. The apparatus of claim 4, wherein the representation of the object is positioned in a predefined position in the output image.

6. The apparatus of claim 1, wherein said image output device comprises a laser printing device suitable for rendering the output image on a substrate.

7. The apparatus of claim 1, wherein said image input device comprises a fixed platen scanner.

8. The apparatus of claim 1, wherein said image input device comprises a scanning device where the document is digitized while being indexed through a scanning nip.

9. A method for processing an image including:
   receiving a digitized image including a representation of an object;
   processing the digitized image on a programmable computer, said computer including a first memory for storing at least a portion of the digitized image and program memory for the storage of executable code suitable for causing said computer to execute image processing operations on the digitized image, identifying, with said computer, the representation of the object within the digitized input image, wherein the step of identifying the representation of the object comprises:

creating a binary representation of the digitized image so as to identify edges of the object:

generating, using the binary representation of the digitized image, a set of binary moments to characterize the shape of the object, including determining, on a scanline basis, the maximum and minimum pixel positions along the scanline for all pixels lying on edges of the object, using the maximum and minimum pixel positions, calculating first order binary moments for each scanline and summing the binary moments, and using the first order binary moments, calculating second order binary moments for the object;

using the binary moments characterizing a shape that has substantially the same area as the object; and from the moments and the shape approximating at least the position and size of the object;

modeling a shape representing a boundary of the object usin a moments;

characterizing the object by parameters including shape, position and orientation;

automatically producing an output image including a representation of the object, wherein the representation has at least one altered parameter; and rendering the output image in a human viewable form.

10. The method of claim 9, wherein the step of identifying the representation of the object comprises:

creating a binary representation of the digitized image so as to identify edges of the object;

generating, using the binary representation of the digitized image, a set of binary moments to characterize the shape of the object;

using the binary moments characterizing a shape that has substantially the same area as the object; and from the moments and the shape approximating at least the position and size of the object.

11. The method of claim 10, wherein the parameters are selected from a set of parameters comprising:

shape;

size;

position; and orientation.

12. The method of claim 1, wherein the position and the orientation of the object are altered, in response to the object parameters, so as to render the object in a derotated manner.

13. The method of claim 12, wherein the representation of the object is positioned in a predefined position in the output image.

* * * * *